(12) United States Patent  (10) Patent No.: US 8,114,275 B2
Sim et al.  (45) Date of Patent: Feb. 14, 2012

(54) REGENERATION TANK FOR WATER SOFTENERS

(75) Inventors: Sang Cheol Sim, Seoul (KR); Won Tae Kim, Gunpo-si (KR)

(73) Assignee: Woongjin Coway Co., Ltd., Gong-Ju-Si, Chungcheongnam-Do (KR)

( * ) Notice: Subject to any disclaimer, the term of this patent is extended or adjusted under 35 U.S.C. 154(b) by 871 days.

(21) Appl. No.: 12/215,498

(22) Filed: Jun. 27, 2008

(65) Prior Publication Data

US 2009/0283458 A1 Nov. 19, 2009

(30) Foreign Application Priority Data

May 13, 2008 (KR) .................. 10-2008-0043795

(51) Int. Cl.
*C02F 5/00* (2006.01)
(52) U.S. Cl. .................. 210/97; 210/269; 210/687
(58) Field of Classification Search .................. 210/687, 210/97, 269
See application file for complete search history.

(56) References Cited

U.S. PATENT DOCUMENTS 2,852,464 A * 9/1958 Nordell .................. 210/676
4,379,057 A * 4/1983 Meiser et al. .................. 210/662
6,521,132 B2 * 2/2003 Hughes .................. 210/673

FOREIGN PATENT DOCUMENTS

| JP | 01-215385 | 8/1989 |
|---|---|---|
| JP | 07-232167 | 9/1995 |
| JP | 11-267642 | 10/1999 |
| JP | 2000-070931 | 3/2000 |
| JP | 2000-218266 | 8/2000 |

OTHER PUBLICATIONS

Japanese Office Action dated May 25, 2010 for corresponding Japanese Patent Application No. 2008-165800.

* cited by examiner

*Primary Examiner* — Fred Prince
(74) *Attorney, Agent, or Firm* — Ohlandt, Greeley, Ruggiero & Perle, LLP

(57) ABSTRACT

A regeneration tank for water softeners which includes a flow rate control unit to control the pressure in the regeneration tank, and a coupling member to protect a connection part between the regeneration tank and a water softener. The regeneration tank includes a hollow casing, which has an open inlet part, through which regenerative substances are supplied into the casing. The hollow casing further has a mounting part, which is coupled to the water softener, and a storage part, which is provided between the open inlet part and the mounting part to contain the regenerative substance therein.

12 Claims, 9 Drawing Sheets

(Prior Art)

REGENERATION TANK FOR WATER SOFTENERS

BACKGROUND OF THE INVENTION

1. Field of the Invention

The present invention relates generally to regeneration tanks for water softeners and, more particularly, to a regeneration tank for water softeners which is controlled such that a flow rate of water, which is drawn into the regeneration tank, and pressure in the regeneration tank can be controlled, and which is provided with a coupling member to protect a connection part between the regeneration tank and a water softener.

2. Description of the Related Art

Generally, tap water, which is hard water, contains a large amount of chlorine used for purification. In addition, due to factors, such as deteriorated pipes or water pollution, tap water may contain various kinds of heavy metals (ions), such as iron, zinc, lead, mercury, etc., having negative influences on human bodies. Although such tap water is not fatal to human bodies, when tap water directly contacts the skin of users washing their skin, metal ions contained in water are bonded to fatty acid of soap, thus forming metallic impurities. Such metallic impurities contact the skin of the users and induce skin diseases or promote skin aging.

To prevent these problems, various water softeners, which change hard water into soft water using a method in which tap water passes through strongly acid cation exchange resins containing sodium ions ($Na^+$) so that ingredients, such as calcium ions ($Ca^{2+}$) and magnesium ions ($Mg^{2+}$), of hard water are substituted with sodium ions of the cation exchange resins, have been developed and used.

The water softeners are operated using the principle by which hard water is changed into soft water by substituting calcium ions and magnesium ions, contained in the hard water, for sodium ions. For this, a soft water tank, which has ion exchange resins made of high molecular compounds containing sodium ions, is an indispensable element of such a water softener.

Meanwhile, a large amount of ion exchange resins having fine grain shapes are stored in the soft water tank of the water softener. In this state, soft water is formed by continuously passing tap water through the soft water and by bringing tap water into contact with the ion exchange resins. As this process is repeated, sodium ingredients are largely removed from the ion exchange resins by continuous contact between tap water and the ion exchange resins. Therefore, typically, the water softeners are provided with regeneration tanks, which contain regenerative substances to regenerate ion exchange resins. Generally, salt, which forms sodium ions when melted in water, is used as a regenerative substance for regeneration of ion exchange resins.

FIG. 1 is a view illustrating regeneration tanks 10 coupled to a water softener 20 according to a conventional technique.

Referring to FIG. 1, the typical water softener 20 includes at least one regeneration tank 10, for example, two regeneration tanks 10, which store tap water therein. A soft water discharge pipe 22 for discharging soft water is coupled to the lower end of the water softener 20. Furthermore, a large amount of ion exchange resins having fine grain shapes is contained in the water softener 20. While the ion exchange resins conduct a water softening function, the amount of sodium ingredients in the ion exchange resins is reduced. The regeneration tanks 10 are coupled to the upper end of the water softener 20 to regenerate the ion exchange resins in the water softener 20.

The regeneration tanks 10 are containers for containing regenerative substances therein. Typically, salt is used as the regenerative substance.

In the regeneration tanks 10, a regeneration solution is formed by dissolving the salt in a predetermined amount of water. The regeneration tanks 10 serve to supply the formed regeneration solution into the water softener 10.

Below, a process of regenerating the water softener 20 using the regeneration tanks 10 according to the conventional technique will be explained.

In the case where the amount of sodium ions in the water softener 20 is reduced with the passage of time, the user can supply sodium ions into the water softener 20 using the regeneration tanks 10. To achieve the above purpose, the user first supplies regenerative solution, which is made by dissolving salt in water, into the regeneration tanks 10. Thereafter, the user couples the regeneration tanks 10 to the upper end of the water softener 20. Then, the regenerative solution is drawn into the water softener 20 through an inlet 12 and is brought into contact with the ion exchange resins to provide sodium ions thereto, thus regenerating the water softener.

However, in the conventional regeneration tank for water softeners, the pressure at which hard water is drawn into regeneration tank through the inlet 12 is not constant. Therefore, depending on the pressure, the flow rate of water drawn into the regeneration tank and the amount of regenerative solution are not constant either. As a result, there are problems in that the time required for regeneration and regeneration efficiency are not constant.

Moreover, in the case of the conventional regeneration tank, because the flow rate of water drawn into the regeneration tank cannot be controlled, if the pressure at which water is drawn into the regeneration tank is relatively high, the regeneration tank may be damaged by the high internal water pressure. In addition, when the regeneration tank is coupled to the water softener or is removed therefrom, a connection part between the regeneration tank and the water softener may be easily damaged, with the result that the regenerative solution may leak or contaminants may be drawn into the regeneration tank or the water softener through the damaged part.

SUMMARY OF THE INVENTION

Accordingly, the present invention has been made keeping in mind the above problems occurring in the prior art, and an object of the present invention is to provide a regeneration tank for water softeners which includes a flow rate control unit to control the pressure in the regeneration tank, and a coupling member to protect a connection part between the regeneration tank and a water softener.

In order to accomplish the above object, the present invention provides a regeneration tank for regenerating a water softener, including: a hollow casing, having an open inlet part so that a regenerative substance is supplied into the casing through the open inlet part, an mounting part to be coupled to the water softener, and a storage part provided between the open inlet part and the mounting part to contain the regenerative substance therein; a cap fitted into the open inlet part to close the open inlet part, the cap being constructed such that a pressure in the casing is adjustable; and a flow control unit installed in the casing to control a flow rate of water drawn into the casing.

Preferably, the flow control unit may include: a stationary member provided in the mounting part, the stationary member having therein a water passage, along which water is drawn into the casing; and a movable member provided in the water passage of the stationary member to open or close the water passage, the movable member being elastically biased by an elastic member in a direction away from an inner surface of the stationary member.

The flow control unit may be operated such that a pressure of the water, drawn into the casing, is maintained within a range from 1 kg/cm² to 3 kg/cm².

The cap may include: a cap body having in a lower end thereof an internal pressure control hole for controlling the pressure in the casing; and a cap cover coupled to an upper end of the cap body so as to be removable.

The cap body may include: a slider guide hole formed in a central portion of an upper surface of the cap body in a vertical direction; a support member coupled to an upper end of the slider guide hole; an elastic member supported at a first end thereof by the support member; a slider connected to a second end of the elastic member and provided in the slider guide hole so as to be movable upwards or downwards along an inner surface of the slider guide hole, so that the slider is elastically biased downwards by the elastic member; and a packing member coupled to the slider to open or close the internal pressure control hole in the cap body depending on the pressure in the casing.

Furthermore, a plurality of fastening protrusions may be provided on the upper surface of the cap body, and a plurality of insert holes may be formed in a lower surface of the cap cover, the insert holes corresponding to the respective fastening protrusions, so that the cap cover is coupled to the cap body by fitting the fastening protrusions into the respective insert holes.

The support member may have a through hole in a center thereof, so that, when the packing member is opened, air in the casing is discharged outside the cap body through the through hole in the support member.

The cap body may be operated such that the pressure in the casing is maintained with in a range from 1 kgf/cm² to 6 kgf/cm².

The regeneration tank may further include: a filter provided in the mounting part of the casing, so that regenerative solution, created in the casing, is supplied into the water softener via the filter.

The regeneration tank may further include: a coupling member coupled to an outer surface of the mounting part of the casing, such that the coupling member and the mounting part are moved in conjunction with each other, wherein a coupling depression may be formed in a lower end of the mounting part, and a locking protrusion may be provided on a lower end of an inner surface of the coupling member, so that the locking protrusion of the coupling member is removably locked to the coupling depression of the mounting part.

The coupling depression may have: an insert space, through which the locking protrusion of the coupling member is inserted into the coupling depression; and a guide space for communicating with the insert space, so that the locking protrusion is moved leftwards or rightwards along the guide space. The locking protrusion may be locked to a locking stop formed between the insert space and guide space of the coupling depression.

Preferably, the coupling depression may have a "T" shape.

In addition, the guide space may extend different lengths leftwards and rightwards based on the insert space.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a regeneration tank for water softeners according to a preferred embodiment of the present invention will be described in detail with reference to the attached drawings.

Figure 1:
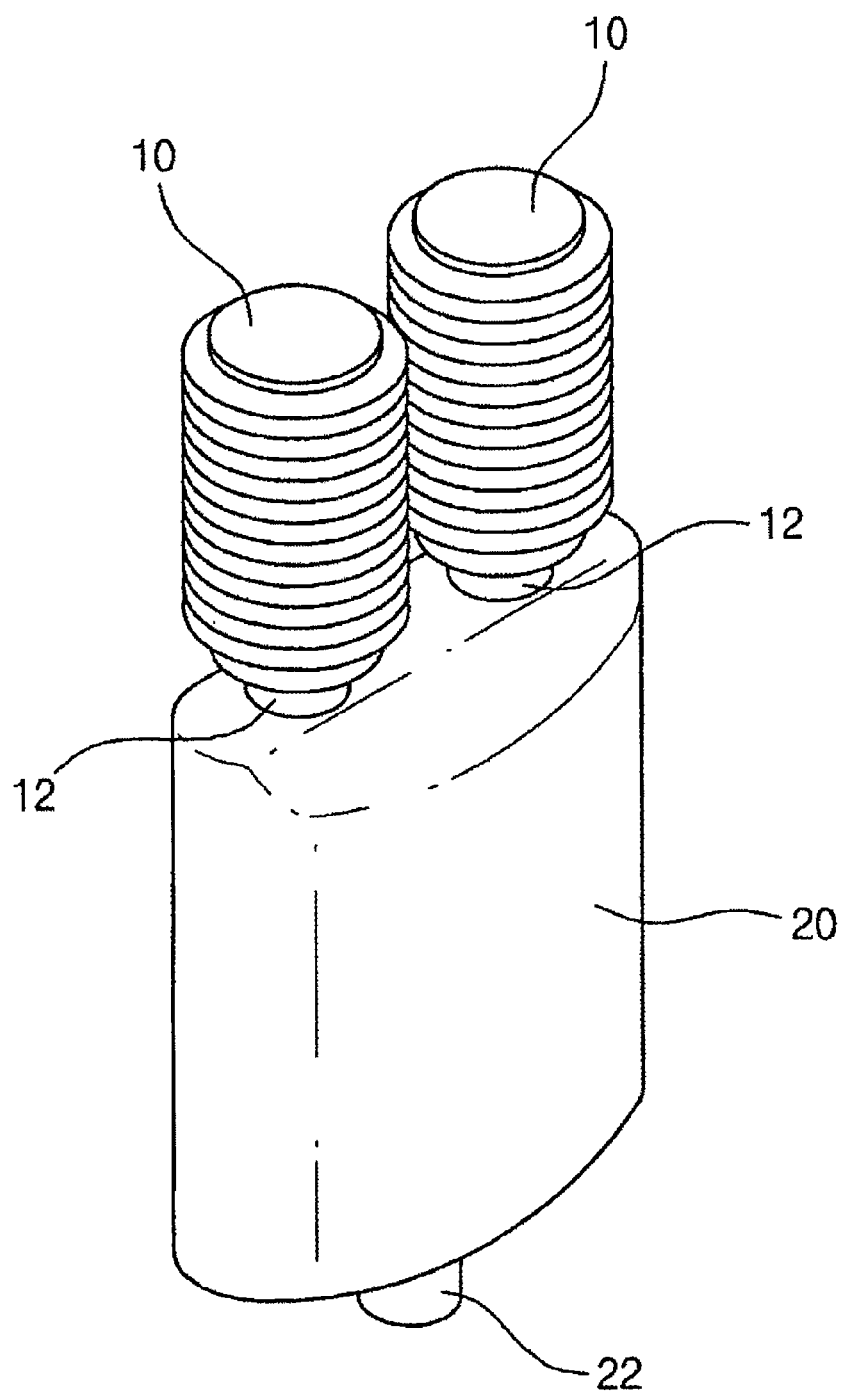
FIG. 1 is a perspective view showing regeneration tanks coupled to a water softener according to a conventional technique.
Figure 2:
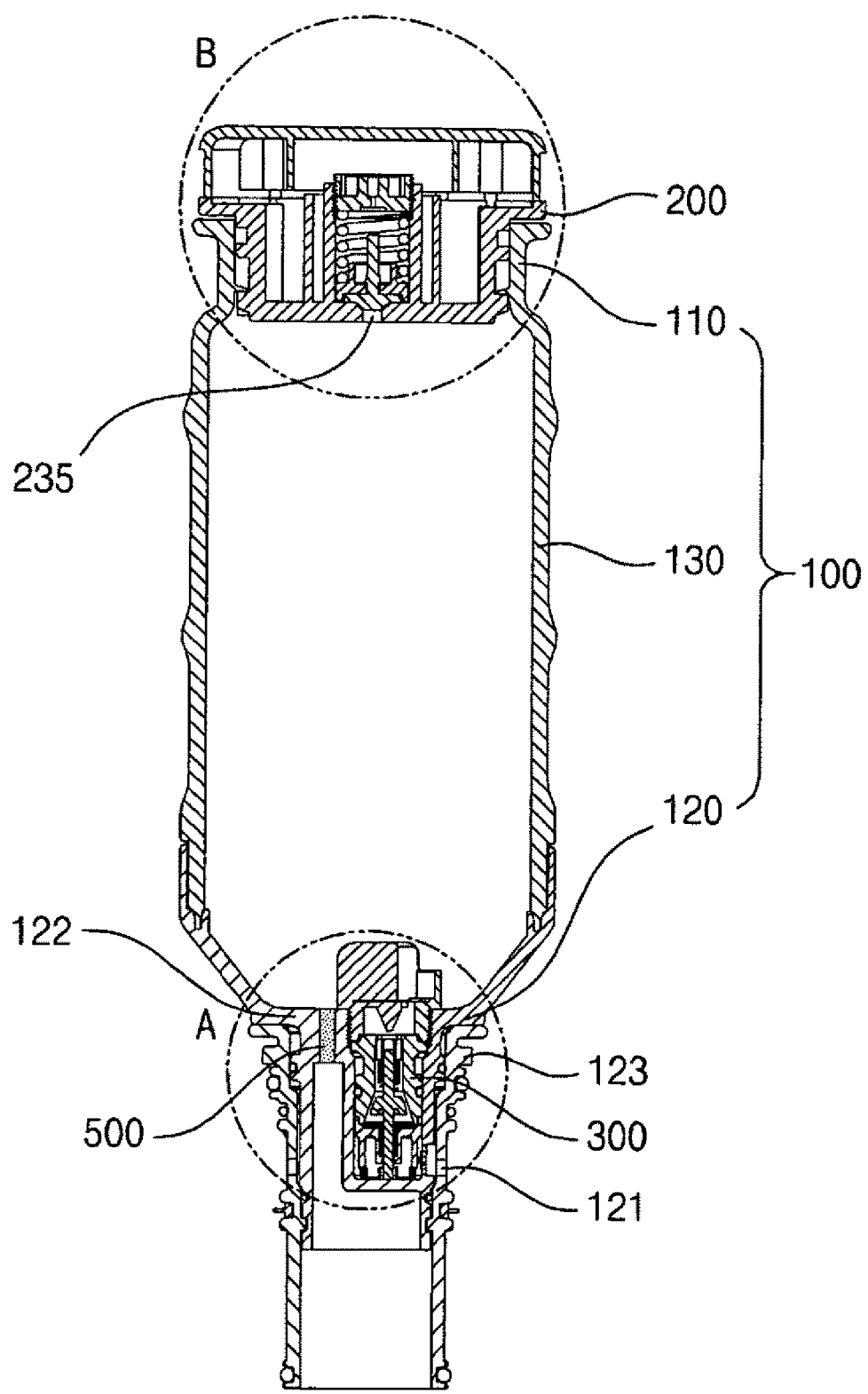
FIG. 2 is a sectional view of a regeneration tank for water softeners, according to an embodiment of the present invention.
Figure 3:
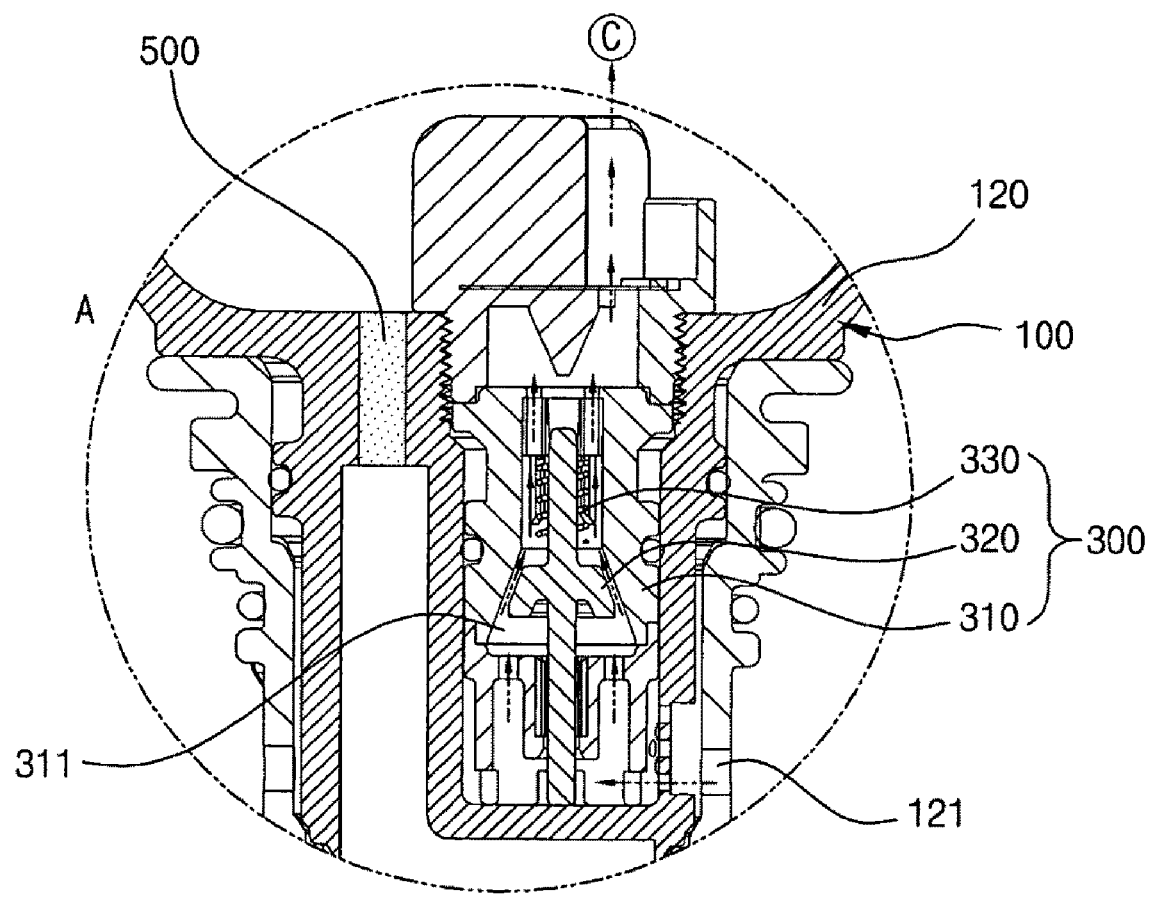
FIG. 3 is an enlarged view of a circled portion A of FIG. 2.

FIG. 2 is a sectional view of the regeneration tank for water softeners, according to the embodiment of the present invention. FIG. 3 is an enlarged view of a circled portion A of FIG. 2.

Referring to FIGS. 2 and 3, the regeneration tank for a water softener according to the present invention includes a casing 100 having a hollow shape, a cap 200, which closes the casing 100, a flow control unit 300, which is installed in the casing 100 to control the flow rate of water drawn into the casing 100, and a filter 500, which is installed in the casing 100, so that regenerative solution, which is created in the casing 100, is supplied into the water softener via the filter 500.

The casing 100 includes an open inlet part 110, through which regenerative substances are supplied into the casing 100, a mounting part 120, which is fitted into a soft water tank of the water softener, and a storage part 130, which is provided between the open inlet part 110 and the mounting part 120 to contain the regenerative substances therein.

The open inlet part 110 and the storage part 130 are integrated with each other into a single body. The mounting part 120 and the storage part 130 may be coupled to each other by a spin welding method. Alternatively, the mounting part 120 and the storage part 130 may be integrated with each other into a single body.

The mounting part 120 has a water inlet 121, into which water is drawn. The flow control unit 300 is installed in the mounting part 120 at a position adjacent to the water inlet 121. Furthermore, a blocking body 122 is provided in the mounting part 120 to support the flow control unit 300 and prevent water, which is drawn into the water inlet 121, from being undesirably discharged outside. The filter 500, through which water in the storage part 130 is discharged into the soft water tank, is provided in the blocking body 122. A coupling protrusion 123 for coupling to the soft water tank is provided on the outer surface of the mounting part 120. Preferably, at least two coupling protrusions 123 are provided, such that the mounting part 120 can be coupled to various types of soft water tanks.

That is, the regeneration tank can be coupled to the water softener or the coupling member through the coupling protrusions 123 of the mounting part 120. The regenerative substances are supplied into the casing 100 through the open inlet part 110, and water is drawn into the regeneration tank through the water inlet 121. Regenerative solution, which is formed by dissolving the regenerative substances in the supplied water in the storage part 130, is discharged through the filter 500 and is supplied into the soft water tank.

Referring to FIG. 3, the flow control unit 300 includes a stationary member 310, which is installed in the mounting part 120, and a movable member 320, which is elastically biased by an elastic member 330 in the direction away from the inner surface of the stationary member 310. In FIG. 3, the arrow C denotes the flow of water.

The stationary member 310 defines therein a water passage 311, along which water drawn through the water inlet 121 of the casing 100 flows into the casing 100.

The movable member 320 is provided in the water passage 311. Under normal conditions, the movable member 320 is maintained by the elastic member 300 at a position at which the water passage 311 is open. When water is drawn into the water inlet 121 at a pressure greater than the restoring force of the elastic member 330, the movable member 320 is moved by the water pressure in the direction in which the water passage 311 narrows.

In other words, the movable member 320 is moved depending on the pressure of water drawn through the water inlet 121, thus adjusting the gap between the stationary member 310 and the movable member 320, thereby maintaining the flow rate of water drawn into the storage part 130 of the casing 100 constant.

It is preferable that a compression spring be used as the elastic member 330.

The flow control unit 300 having the above-mentioned construction is operated such that the pressure of water drawn into the casing 100 is maintained within a range from 1 kg/cm$^2$ to 3 kg/cm$^2$, and, most preferably, at a 2.5 kg/cm$^2$.

As shown in FIGS. 2 and 3, the filter 500 is placed through the blocking body 122, which is provided in the mounting part 120. Furthermore, the filter 500 has a cylindrical shape having a length corresponding to the thickness of the blocking body 122. The filter 500 is made of a material which enables the passing of a regenerative solution containing sodium ions and chlorine ions, which are created by dissolving regenerative substances in water, and can prevent the passage of regenerative substances that remain undissolved in water.

Figure 4:
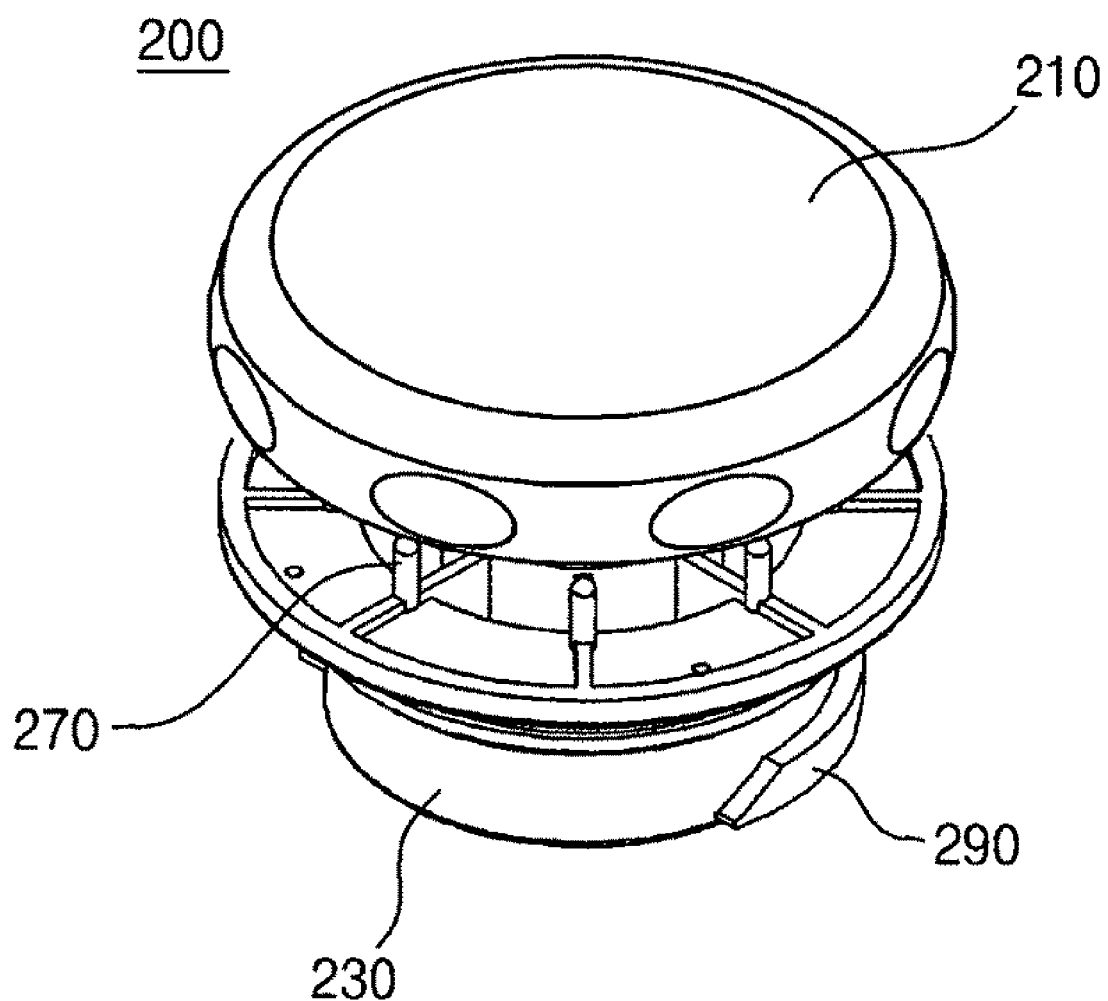
FIG. 4 is a perspective view showing a cap separated from a casing of the regeneration tank according to the embodiment of the present invention.
Figure 5:
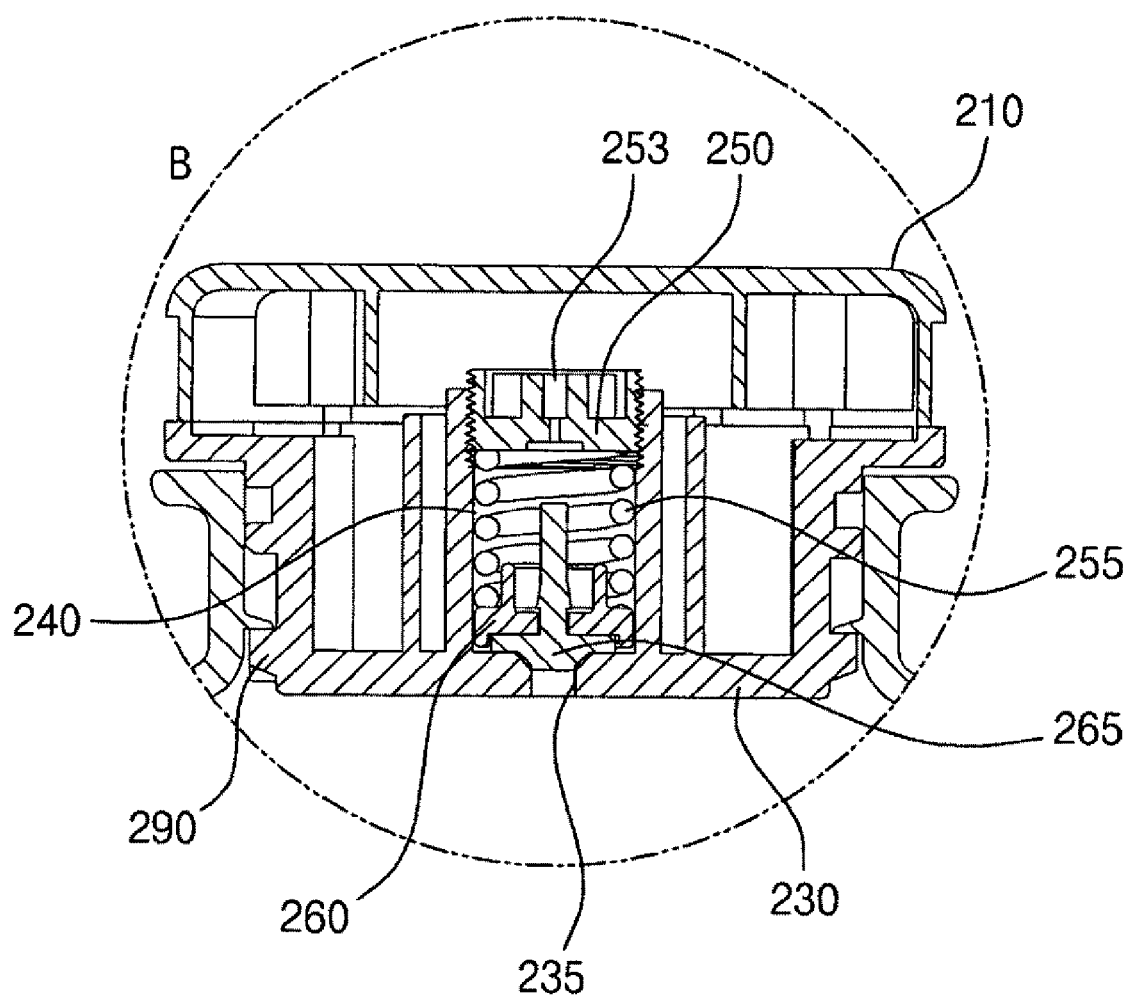
FIG. 5 is an enlarged view of a circled portion B of FIG. 2.
Figure 6:
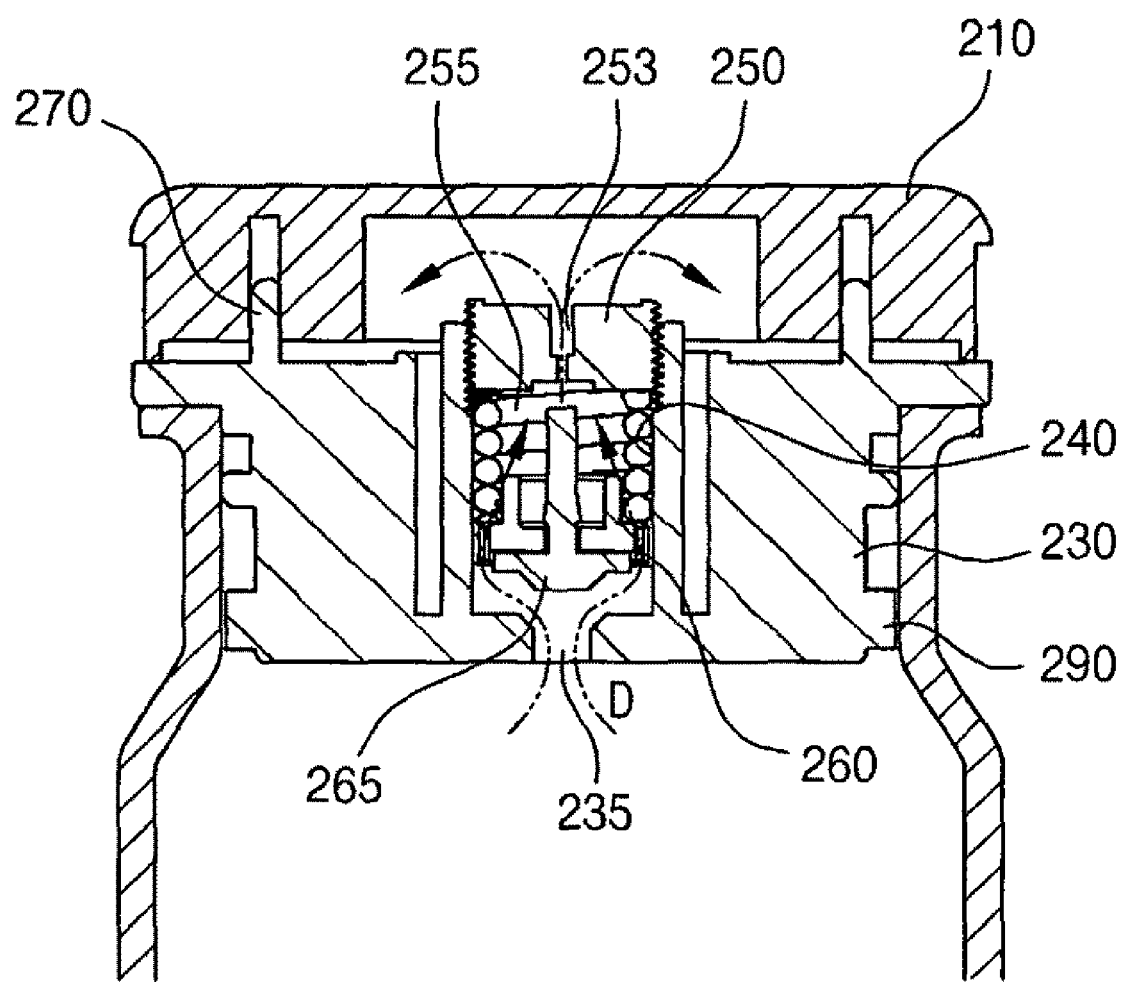
FIG. 6 is a view showing the operation of the cap of FIG. 4.

FIG. 4 is a perspective view showing the cap 200 separated from the casing 100 according to the present invention. FIG. 5 is an enlarged view of a circled portion B of FIG. 2. FIG. 6 is a view showing the operation of the cap 200 of FIG. 4. In FIG. 6, the arrow D denotes the flow of air when the cap 200 is in operation.

As shown in FIGS. 4 through 6, the cap 200 includes a cap body 230, which has in the lower end thereof an internal pressure control hole 235 for controlling the pressure in the regeneration tank, and a cap cover 210, which is removably coupled to the upper end of the cap body 230.

The cap body 230 and the cap cover 210 may have various shapes. Preferably, the cap body 230 and the cap cover 210 have cylindrical shapes to enable a user to easily couple the cap 200 to the regeneration tank or to easily remove it therefrom. The reason for this is that a cap is typically coupled to a desired member by a screw-coupling method, in which a user couples the cap to the desired member by rotating the cap.

A coupling part 290 is provided on the outer surface of the cap body 230 and extends a predetermined length in the circumferential direction. The cap 200 can be coupled to the casing 100 of the regeneration tank by engagement of the coupling part 290 with a coupling groove, which is formed in the casing 100.

The cap cover 210 may be provided with a rubber packing, which extends in the circumferential direction, thus preventing slipping due to reduced frictional force between the hand of the user and the cap 200 attributable to water or sweat when the user rotates the cap 200, and protecting the cap 200 from external impact.

Furthermore, fastening protrusions 270 are provided on the upper surface of the cap body 230 and are arranged at positions spaced apart from each other at regular intervals in the circumferential direction of the cap body 230. Insert holes (not shown) are formed in the lower surface of the cap cover 210 to correspond to respective fastening protrusions 270. Thus, the cap cover 210 is fastened to the cap body 230 by fitting the fastening protrusions 270 into respective insert holes.

Because the fastening protrusions 270 are firmly fixed to the upper surface of the cap body 230, the fastening protrusions 270, which are fitted into the respective insert holes in the cap cover 210, can prevent the cap cover 210 from being undesirably removed therefrom by external force.

Furthermore, the coupling part 290, which is provided on the outer surface of the lower end of the cap body 230, facilitates the coupling of the cap 200 to the casing 100 of the regeneration tank.

Referring to FIGS. 4 through 6, the cap body 230 includes a slider guide hole 240, which is vertically formed in the central portion of the cap body 230, and a support member 250, which is coupled to the upper end of the slider guide hole 240. The cap body 230 further includes an elastic member 255, which is supported at the upper end thereof by the support member 250, and a slider 260, which contacts the lower end of the elastic member 255 and is movable upwards or downwards along the slider guide hole 240. The slider 260 is elastically biased by the elastic member 255 in the direction away from the support member 250. The cap body 230 further includes a packing member 265, which is coupled at one surface thereof to the slider 260 and opens or closes the internal pressure control hole 235 in the cap body 230 depending on the pressure in the regeneration tank.

Preferably, the slider guide hole 240, which is formed in the cap body 230, extends downwards from the center of the upper surface of the cap body 230 to a predetermined depth. Furthermore, the slider guide hole 240 may have a circular or polygonal cross-section, and the slider 260 has a cross-sectional shape corresponding to that of the slider guide hole 240.

The support member 250 is fastened to the upper end of the slider guide hole 240, and, preferably, it is fastened to the inner surface of the slider guide hole 240 by a screw-coupling method. The elastic member 255 is provided under the lower end of the support member 250. Here, to prevent the support member 250 from being removed from the cap body 230 by the elastic force of the elastic member 255, the support member 250 must be firmly fastened to the upper end of the slider guide hole 240.

Furthermore, the elastic force of the elastic member 255 can be adjusted by adjusting the depth to which the support member 250 is inserted into the slider guide hole 240. Thereby, the control range of the internal pressure of the regeneration tank can also be adjusted. In detail, if the support member 250 is relatively deeply inserted into the slider guide hole 240, the elastic force of the elastic member 255 is increased. In this case, the support member 250 is moved when pressure greater than an allowable value, which is higher than that when the support member 250 is relatively shallowly inserted into the slider guide hole 240, is applied thereto. Therefore, preferably, if the value of the control range of the internal pressure of the regeneration tank is low, the support member 250 is inserted into the slider guide hole 240 to a relatively shallow position. Conversely, if the value of the control range of the internal pressure of the regeneration tank is high, it is preferable that the support member 250 be inserted into the slider guide hole 240 to a relatively deep position.

The support member 250 has a through hole 253 in the center thereof. Thus, when the packing member 265 is opened, air in the regeneration tank is discharged outside the cap body 230 through the slider guide hole 240 and the through hole 253 in the support member 250. Thereby, the pressure in the regeneration tank can be reduced.

The elastic member 255 is placed in the slider guide hole 240 such that the upper end of the elastic member 255 is in contact with the lower surface of the support member 250 and the lower end thereof is in contact with the slider 260. Typically, a spring is used as the elastic member 255. Preferably, the spring may be treated by electropolishing to increase the strength of the spring and make the surface thereof smooth.

As such, because the upper end of the elastic member 255 is supported by the lower surface of the support member 250 and the lower end thereof is coupled to the slider 260, the slider 260 is biased by the elastic member 255 in the direction toward the lower end of the slider guide hole 240 of the cap body 230.

The slider 260 is coupled to the lower end of the elastic member 255 and moves upwards or downwards along the inner surface of the slider guide hole 240 in response to the relationship between the elastic force of the elastic member 255 and the internal pressure of the regeneration tank.

In other words, if the internal pressure of the regeneration tank is higher than the elastic force of the elastic member 255, the elastic member 255 is contracted, that is, the slider 260 overcomes the elastic force of the elastic member 255 and thus moves upwards along the slider guide hole 240. Thereafter, when the internal pressure of the regeneration tank becomes lower than the elastic force of the elastic member 255, the elastic member 255 is returned to its original state by the restoring force thereof, that is, the slider 260 is moved downwards along the slider guide hole 240 by the restoring force of the elastic member 255.

The packing member 265 is coupled to the slider 260 and serves to open or close the internal pressure control hole 235 in the cap body 230 depending on the pressure in the regeneration tank. In other words, the internal pressure control hole 235 is formed in the lower end of the cap body 230, and the packing member 265 closes the internal pressure control hole 235 under normal conditions. The packing member 265 is coupled at the upper surface thereof to the slider 260, so that the packing member 265 and the slider 260 are moved together.

Hence, if the internal pressure in the regeneration tank is higher than the elastic force of the elastic member 255, the packing member 265 moves upwards and thus opens the pressure control hole 235. When the internal pressure in the regeneration tank is lower than the elastic force of the elastic member 255, the packing member 265 is moved downwards by the restoring force of the elastic member 255, thus closing the pressure control hole 235.

Preferably, the cap 200 having the above-mentioned operating structure is operated such that the internal pressure in the regeneration tank is maintained within a range from 1 kgf/cm$^2$ to 6 kgf/cm$^2$, and, more preferably, a range from 2.6 kgf/cm$^2$ to 3.4 kgf/cm$^2$.

Figure 7:
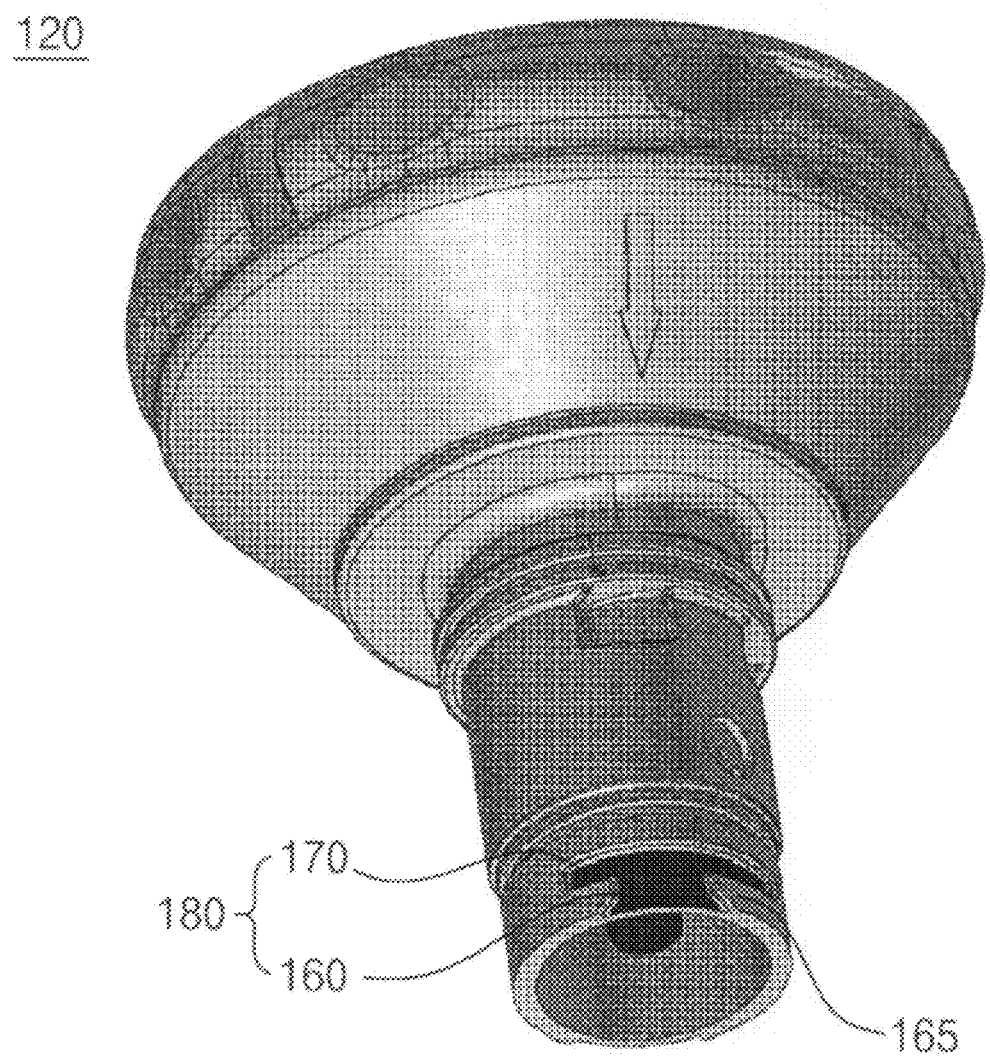
FIG. 7 is a perspective view of a mounting part of the regeneration tank of FIG. 2.
Figure 8:
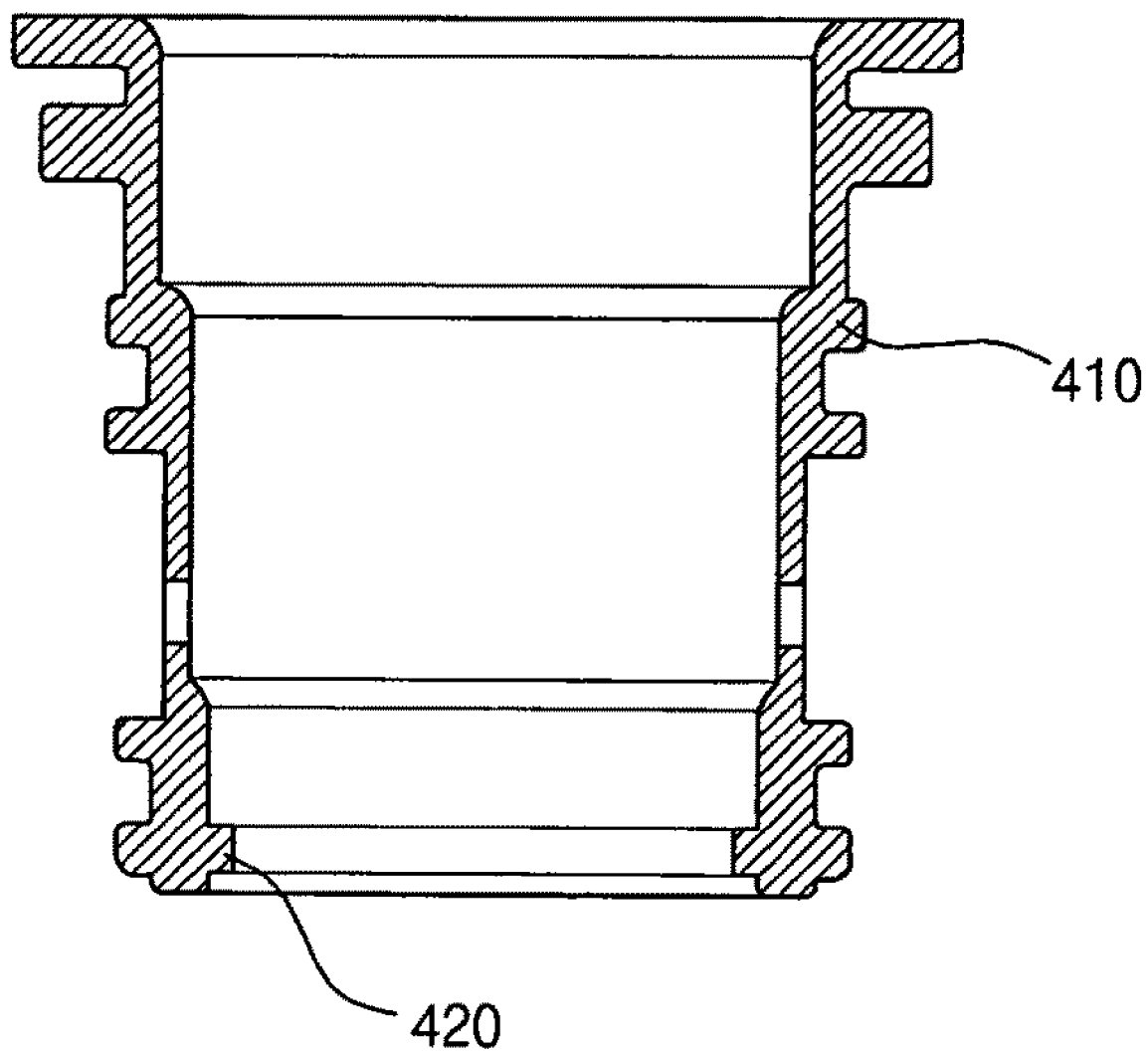
FIG. 8 is a sectional view of a coupling member, which is coupled to the mounting part of the regeneration tank according to the present invention.
Figure 9:
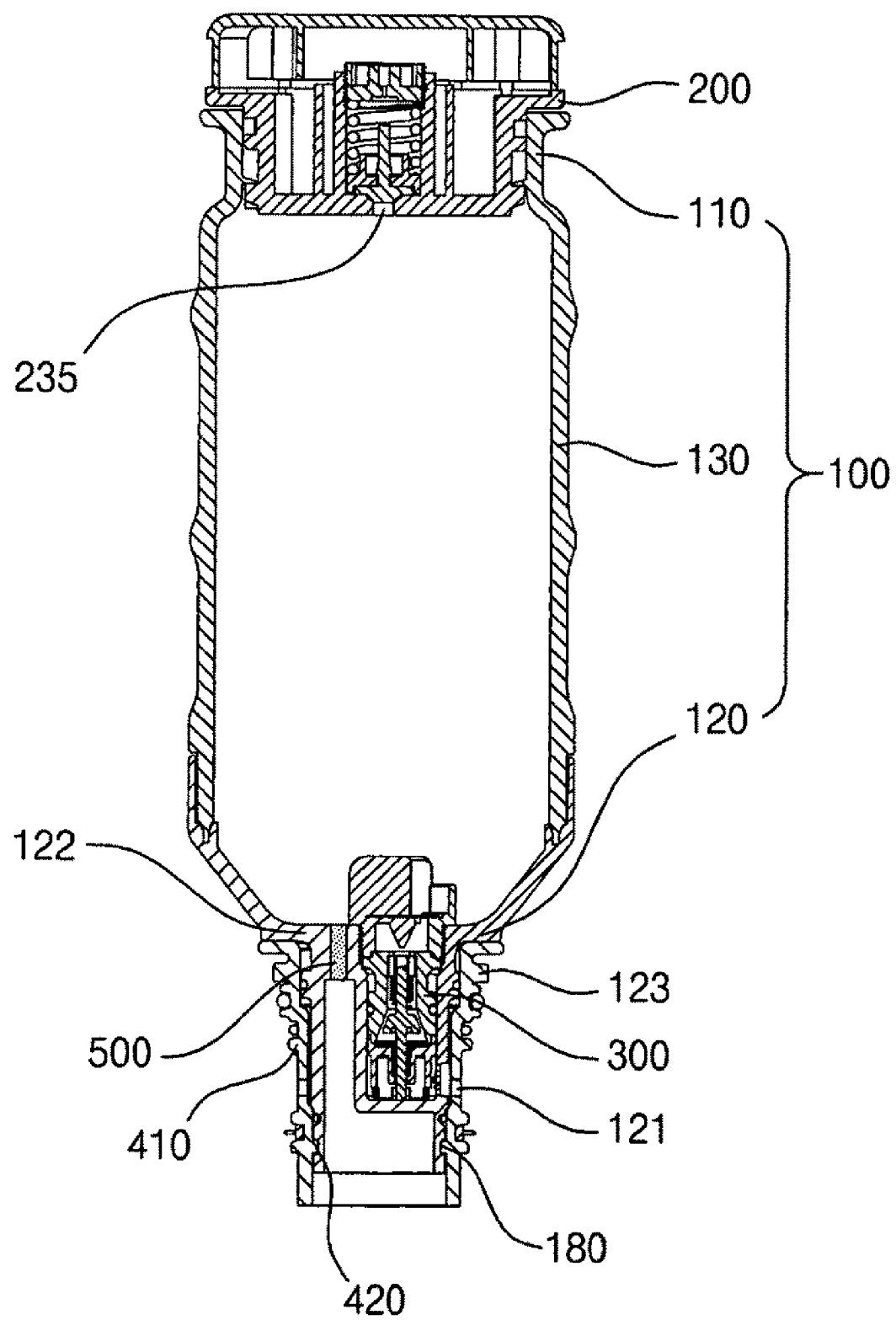
FIG. 9 is a view showing the coupling of the coupling member to the regeneration tank according to the present invention.

FIG. 7 is a perspective view of the mounting part 120 of the regeneration tank of FIG. 2. FIG. 8 is a sectional view of the coupling member 400, which is coupled to the mounting part 120. FIG. 9 is a view showing the coupling of the coupling member 400 to the regeneration tank.

The coupling member 400 may be fitted over the mounting part 120, such that they are moved in conjunction with each other.

As shown in FIG. 8, the coupling member 400 includes a body part 410, which has a hollow cylindrical shape, and a locking protrusion 420, which is provided on the lower end of the inner surface of the body part 410. The locking protrusion 420 serves to fasten the coupling member 400 to the mounting part 120 at the correct position.

A coupling depression 180 is formed in the lower end of the mounting part 120. The coupling depression 180 includes an insert space 160, into which the locking protrusion 420, provided on the lower end of the coupling member 400, is inserted, and a guide space 170, which communicates with the insert space 160, and along which the locking protrusion 420 is moved.

The coupling depression 180 has a "T" shape overall. A locking stop 165 is formed between the insert space 160 and the guide space 170.

When the coupling member 400 is fitted over the mounting part 120, the locking protrusion 420 of the coupling member 400 is inserted into the insert space 160 of the coupling depression 180. When the coupling member 400 and the regeneration tank are rotated with respect to each other, the locking protrusion 420 of the coupling member 400 is moved to the left or right along the guide space 170 of the coupling depression 180, which is formed in the mounting part 120.

Here, the guide space 170 extends to the left and the right based on the insert space 160, and the lengths of the left portion and the right portion thereof may be different from each other.

Below, the operation of the regeneration tank for the water softener having the coupling member 400 will be explained with reference to FIG. 9.

In the case where the amount of sodium ions in ion exchange resins in the regeneration tank is reduced with the passage of time, the supply of sodium ions into the regeneration tank is required.

To achieve the above-mentioned purpose, the cap 200 of the regeneration tank is first separated from the casing 100, and an appropriate amount of regenerative substances are supplied into the casing 100. Typically, salt is used as regenerative substances.

Thereafter, the cap 200 is coupled to the open inlet part 110 of the casing 100. Subsequently, the mounting part 120 is fitted into the upper end of the water softener. Then, water is drawn from the outside into the casing 100. Here, typically, the term 'water' means tap water.

Tap water, which is drawn into the storage part 130 of the casing 100, melts salt, which is contained in the storage part 130, thus creating a regenerative solution. The regenerative solution flows downwards due to gravity and thus enters the soft water tank. The regenerative solution, which is drawn into the soft water tank, passes through the ion exchange resins and thus provides sodium ions thereto, thereby regenerating the water softener.

The coupling member 400 may be coupled to the mounting part 120 of the regeneration tank for the water softener. If the mounting part 120 of the regeneration tank is directly coupled to the water softener, when an external impact is applied thereto, the mounting part 120 may be easily damaged. In this case, because the user must replace the entire regeneration tank with a new one, the maintenance costs are increased. Furthermore, contaminants may be drawn into the damaged portion of the mounting part 120. However, in the present invention, such problems can be solved by the installation of the coupling member 400.

That is, in the present invention, the coupling member 400 is fitted over the mounting part 120, so that, even if an external impact is applied thereto, the coupling member 400 absorbs the impact, thus preventing the mounting part 120 from being damaged.

When fitting the coupling member 400 over the mounting part 120, the locking protrusion 420 of the coupling member 400 is inserted into the insert space 160 in the coupling depression 180, which is formed in the mounting part 120. The locking protrusion 420 of the coupling member 400 is moved to the left or the right along the guide space 170 of the coupling depression 180 by rotating the coupling member 400 with respect to the regeneration tank.

Due to the coupling depression 180 having the above-mentioned shape, when the regeneration tank, which is provided with the coupling member 400, is coupled to the water softener, because the locking protrusion 420 of the coupling member 400 moves along the guide space 170 of the coupling depression 180, the regeneration tank and the coupling member 200 are rotated together within a predetermined section in the direction in which external force is applied thereto.

Furthermore, to separate the regeneration tank from the water softener, when the regeneration tank is rotated in the direction opposite the direction in which the regeneration tank is coupled to the water softener, the regeneration tank and the coupling member 400 are also rotated together, thus facilitating the removal of the regeneration tank from the water softener.

Furthermore, the locking protrusion 420 of the coupling member 400 is locked to the locking stop 165, which is formed between the insert space 160 and the guide space 170 of the coupling depression 180.

Meanwhile, when separating the coupling member 400 from the regeneration tank, the locking protrusion 420 of the coupling member 400 is removed from the coupling depression 180 through the insert space 160.

The left portion and the right portion of the guide space 170 of the coupling depression 180 may extend different lengths from the insert space 160. Due to this structure, in the case where the locking protrusion 420 of the coupling member 400 is in a state of having been inserted into the shorter portion of the left and right portions of the guide space 170, the coupling member 400 can be easily separated from the regeneration tank when necessary.

As such, because the coupling member 400 is mounted to the regeneration tank, the mounting part 120, through which the regeneration tank is coupled to the water softener, is prevented from being damaged. Even if the coupling member 400 is damaged, the regeneration tank can be continuously used by replacing only the coupling member 400 with a new one. Therefore, there is an advantage in that maintenance costs are reduced. Furthermore, the regeneration tank can be applied to all kinds of water softeners merely by selecting a coupling member corresponding to the kind of water softener, thus being economical.

As described above, the present invention provides a regeneration tank for water softeners which can control a flow rate of water drawn into the regeneration tank, thus maintaining the flow rate of a regenerative solution, the time required for regeneration and the regeneration efficiency constant. Furthermore, the pressure in the regeneration tank is controlled, so that the regeneration tank is prevented from being damaged by increased internal pressure. In addition, because the regeneration tank is provided with a coupling member, part of the regeneration tank which is coupled to a water softener can be protected. Even if the coupling member is damaged, the regeneration tank can be continuously used merely by replacing the coupling member with a new one, thus reducing the maintenance costs. Moreover, the regeneration tank can be applied to various kinds of water softeners by selecting a coupling member adapted for a desired water softener, thus being economical.

Although the preferred embodiment of the present invention has been disclosed for illustrative purposes, the present invention is not limited to the embodiment. Furthermore, those skilled in the art will appreciate that various modifications, additions and substitutions are possible, without departing from the scope and spirit of the invention as disclosed in the accompanying claims. Therefore, these modifications, additions and substitutions must be regarded as falling within the bounds of the present invention.

What is claimed is:

1. A regeneration tank for regenerating a water softener, comprising:
    a hollow casing, having an open inlet part so that a regenerative substance is supplied into the casing through the open inlet part, an mounting part to be coupled to the water softener, and a storage part provided between the open inlet part and the mounting part to contain the regenerative substance therein;
    a cap fitted into the open inlet part to close the open inlet part, the cap being constructed such that a pressure in the casing is adjustable; and
    a flow control unit installed in the casing to control a flow rate of water drawn into the casing
    wherein the flow control unit comprises
    a stationary member provided in the mounting part, the stationary member having therein a water passage, along which water is drawn into the casing; and
    a movable member provided in the water passage of the stationary member to open or close the water passage, the movable member being elastically biased by an elastic member in a direction away from an inner surface of the stationary member.

2. The regeneration tank as set forth in claim 1, wherein the flow control unit is operated such that a pressure of the water, drawn into the casing, is maintained within a range from 1 $kg/cm^2$ to 3 $kg/cm^2$.

3. The regeneration tank as set forth in claim 1, wherein the cap comprises:
    a cap body having in a lower end thereof an internal pressure control hole for controlling the pressure in the casing; and
    a cap cover coupled to an upper end of the cap body so as to be removable.

4. The regeneration tank as set forth in claim 3, wherein the cap body comprises:
    a slider guide hole formed in a central portion of an upper surface of the cap body in a vertical direction;
    a support member coupled to an upper end of the slider guide hole;

an elastic member supported at a first end thereof by the support member;

a slider connected to a second end of the elastic member and provided in the slider guide hole so as to be movable upwards or downwards along an inner surface of the slider guide hole, so that the slider is elastically biased downwards by the elastic member; and a packing member coupled to the slider to open or close the internal pressure control hole in the cap body depending on the pressure in the casing.

5. The regeneration tank as set forth in claim 4, wherein the support member has a through hole in a center thereof, so that, when the packing member is opened, air in the casing is discharged outside the cap body through the through hole in the support member.

6. The regeneration tank as set forth in claim 3, wherein a plurality of fastening protrusions is provided on the upper surface of the cap body, and a plurality of insert holes is formed in a lower surface of the cap cover, the insert holes corresponding to the respective fastening protrusions, so that the cap cover is coupled to the cap body by fitting the fastening protrusions into the respective insert holes.

7. The regeneration tank as set forth in claim 3, wherein the cap body is operated such that the pressure in the casing is maintained with in a range from 1 kgf/cm$^2$ to 6 kgf/cm$^2$.

8. The regeneration tank as set forth in claim 1, further comprising:

a filter provided in the mounting part of the casing, so that regenerative solution, created in the casing, is supplied into the water softener via the filter.

9. The regeneration tank as set forth in claim 1, further comprising:

a coupling member coupled to an outer surface of the mounting part of the casing, such that the coupling member and the mounting part are moved in conjunction with each other, wherein a coupling depression is formed in a lower end of the mounting part, and a locking protrusion is provided on a lower end of an inner surface of the coupling member, so that the locking protrusion of the coupling member is removably locked to the coupling depression of the mounting part.

10. The regeneration tank as set forth in claim 9, wherein the coupling depression has: an insert space, through which the locking protrusion of the coupling member is inserted into the coupling depression; and a guide space for communicating with the insert space, so that the locking protrusion is moved leftwards or rightwards along the guide space, and the locking protrusion is locked to a locking stop formed between the insert space and guide space of the coupling depression.

11. The regeneration tank as set forth in claim 9, wherein the coupling depression has a "T" shape.

12. The regeneration tank as set forth in claim 9, wherein the guide space extends different lengths leftwards and rightwards based on the insert space.

* * * * *